Feb. 13, 1968  G. J. FAIRBANKS  3,368,584
SOLENOID OPERATED VALVE ASSEMBLY
Filed Jan. 4, 1966
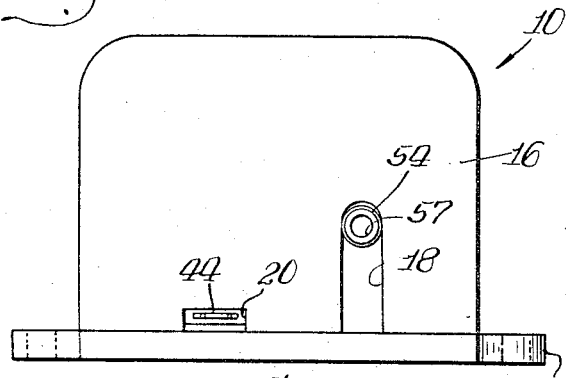
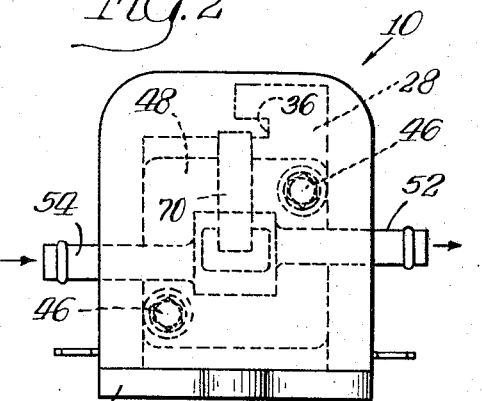
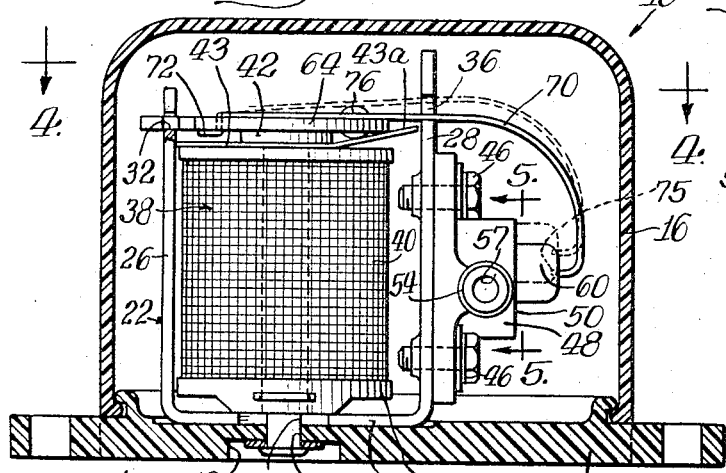
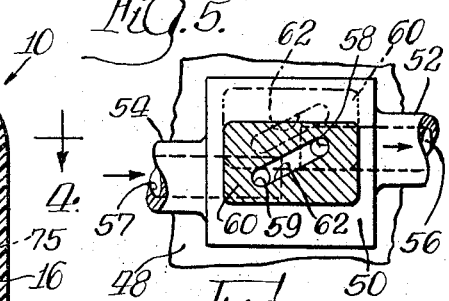
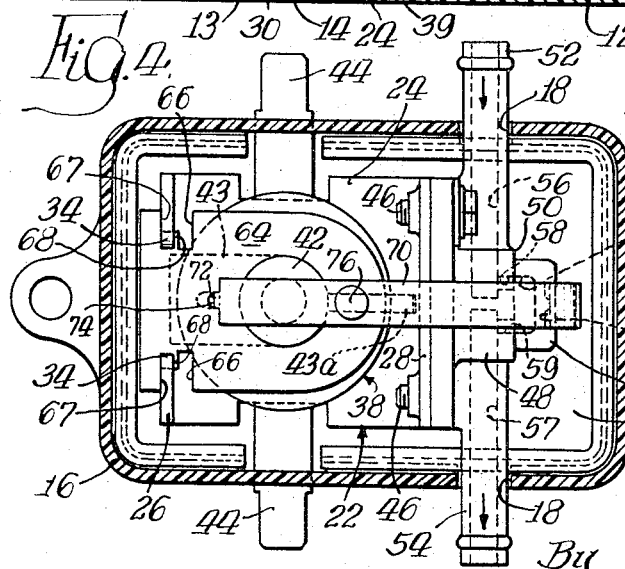
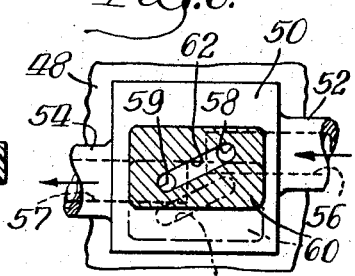
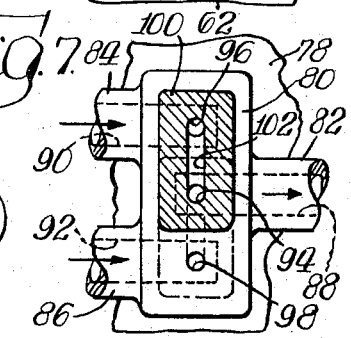
Inventor:-
Gordon J. Fairbanks,
By *William J. Brown*
Atty.

United States Patent Office 3,368,584
Patented Feb. 13, 1968

---

3,368,584
SOLENOID OPERATED VALVE ASSEMBLY
Gordon J. Fairbanks, Indianapolis, Ind., assignor to Stewart-Warner Corporation, Chicago, Ill., a corporation of Virginia
Filed Jan. 4, 1966, Ser. No. 518,574
10 Claims. (Cl. 137—625.65)

My present invention relates generally to solenoid operated slide valve assemblies which may be used, for example, in a vacuum system for controlling a vacuum actuated device.

In brief, the solenoid operated valve assemblies of my present invention comprise a valve body having at least first and second passageways therein, a valve member movable between one operative position placing the first and second passageways in communication and another operative position interrupting communication between the first and second passageways, a solenoid, and a leaf spring mounted adjacent its one end for movement relative to the solenoid and connected at its other end to the valve member. The first and second passageways are adapted to be connected, for example, to a source of vacuum and to the one end of a valve actuator.

In one embodiment of my invention, the leaf spring normally disposes the valve member in the operative position interrupting communication between the first and second passageways. While the valve member is in this position, the passageway leading to the valve actuator is open to the atmosphere. Upon energization of the solenoid, the leaf spring is moved toward the latter thereby effecting movement of the valve member to the operative position placing the first and second passageways in communication whereby the vacuum system is permitted to effect movement of the valve actuator from a first position to a second position. Thereafter, when the solenoid is de-energized, the valve member is returned to the position interrupting communication between the first and second passageways, the passageway leading to the valve actuator is opened to the atmosphere, and a spring associated with the valve actuator returns the latter from its second position to its first position. The valve actuator is thus vacuum operated in one direction and spring operated in the other direction.

In another embodiment of my present invention, the leaf spring normally disposes the valve member in the operative position placing the first and second passageways in communication, and energization of the solenoid serves to move the valve member, through movement of the leaf spring, to the operative position interrupting communication between the first and second passageways. In all other respects, the first two embodiments of my invention are substantially the same, and movement of the valve member in either embodiment between its two operative positions serves to control movement of the valve actuator between its first and second positions.

In a further embodiment of my present invention, the valve body is provided with first, second and third passageways. The first passageway is connected to a source of vacuum and the second and third passageways are connected to the opposite ends of the valve actuator. The valve member is movable between a first operative position placing the first and second passageways in communication whereby the valve actuator is moved from its first to its second position, and a second operative position placing the first and third passageways in communication whereby the valve actuator is moved from its second to its first position. Movement of the valve member is effected by the leaf spring which is responsive to energization of the solenoid. In the use of this embodiment of my invention, the valve actuator is vacuum operated in both directions and does not require any auxiliary springs.

The solenoid operated valve assemblies of my present invention, as will be described in greater detail hereinafter, are so constructed that they are simple and efficient in operation, that the leaf spring substantially alone furnishes the requisite spring tension attendant to movement of the valve member, and that the use of a pin hinge is eliminated.

Now in order to acquaint those skilled in the art with the manner of constructing and using devices in accordance with the principles of my present invention, I shall describe in connection wtih the accompanying drawing, preferred embodiments of my invention.

In the drawing:

FIGURE 1 is a side elevational view of one embodiment of solenoid operated valve assembly of my present invention;

FIGURE 2 is an end elevational view of the solenoid operated valve assembly of FIGURE 1;

FIGURE 3 is a view, partly in section and partly in side elevation, showing the interior of the solenoid operated valve assembly of FIGURE 1;

FIGURE 4 is a sectional view, taken substantially along the line 4—4 in FIGURE 3, looking in the direction indicated by the arrows;

FIGURE 5 is a fragmentary sectional view, taken substantially along the line 5—5 in FIGURE 3, looking in the direction indicated by the arrows;

FIGURE 6 is a fragmentary sectional view corresponding generally to FIGURE 5, but illustrating another embodiment of my present invention; and FIGURE 7 is a fragmentary sectional view corresponding generally to FIGURE 5, but illustrating still another embodiment of my present invention.

Referring now to FIGURES 1–5, there is indicated generally by the reference numeral 10 one embodiment of solenoid operated slide valve assembly incorporating the principles of my present invention. The assembly 10 comprises a base member 12 having a central recess 13 and opening 14 therein, and a cover or closure member 16 having opposed side slots 18 and opposed side cutouts 20. The base member 12 and cover member 16 are suitably fabricated of a non-conducting material such as polypropylene copolymer.

Arranged within the confines of the cover member 16 is a generally U-shaped combined core and mounting bracket 22 having a horizontal bight portion 24 and vertically extending substantially parallel first and second leg portions 26 and 28. The bight portion 24 is formed with a central aperture 30 which overlies the opening 14 in the base member 12; the first leg portion 26 adjacent its upper outer end is formed with an open-top slot 32 and cooperating laterally inwardly directed ear portions 34; and the second leg portion 28 adjacent its upper outer end is formed with a slot 36 which is open on its one side. The bracket 22 is fabricated of magnetic material such as steel.

Disposed intermediate and lengthwise of the first and second leg portions 26 and 28 of the bracket 22 is a vertically extending solenoid 38 comprised of a conventional spool 39 of nonconducting material, a coil 40 wound on the spool, and a core 42 of iron r steel extending axially through the coil. Preferably, a spring washer 43 is interposed between the spool 39 and core 42, and is provided with a resilient angular spring arm 43a. The windings of the coil 42 have suitable connection with opposed horizontal laterally extending electrical terminal strips 44 which project from the spool 39 outwardly of the cover member 16 through the cutouts 20. The lower end of the core 42 projects through the aperture 30 in the bracket 22 and the opening 14 in the base member 12, and is suitably peened over within the confines of the recess 13 to secure together the bracket 22, the solenoid 38 and the base member 12.

A valve body or block 48 is secured to the outboard side of the second leg portion 28 of the bracket 22 by bolts 46 extending through the flange portion of the valve body. The valve body 48 has a vertical planar side face 50, and opposed laterally extending arm members 52 and 54 which project outwardly of the cover member 16 through the slots 18. The arm members 52 and 54 are respectively formed with bores 56 and 57 that communicate at their inner ends with ports 58 and 59 which open at the planar face 50. The bore 56 and port 58 define a first passageway, and the bore 57 and port 59 define a second passageway, in the valve body 48. Vertically slidable along the planar face 50 of the valve body 48 is a valve member 60 having a diagonal channel 62 in the side thereof that abuts the planar face 50.

Located at the upper end of the solenoid 38 is a generally horizontal armature 64 which is formed with opposed stepped notches 66, rear bearing edges 67 and shoulder portions 68. In assembly, the armature 64 is first moved downwardly into the slot 32 of the bracket 22 with the ear portions 34 passing through the enlarged areas of the notches 66. Then, the armature 64 is slid forwardly until the shoulder portions 68 are disposed beneath the ear portions 34 and the rear bearing edges 67 engage the outboard side of the first leg portion 26 of the bracket 22. In this position, the rear end portion of the armature 64 rests on the horizontal edge of the slot 32 in the bracket 22, and the armature 64 is thereby pivotally mounted in the bracket 22.

Extending forwardly from the armature 64 is resilient means in the form of a leaf spring 70. The rear end of the leaf spring 70 is secured to the armature 64 by a tongue 72 at its rear edge that interlocks with an aperture 74 in the armature 64 and also by a rivet 76. The leaf spring 70, intermediate of its ends, passes through the slot 36 in the second leg portion 28 of the bracket 22, with the upper and lower edges of the slot 36 defining stop means for limiting pivotal movement of the leaf spring 70. The forward portion of the leaf spring 70 curves arcuately downwardly and at its lower end is turned inwardly terminating in a mating recess 75 in the valve member 60. The tensile force of leaf spring 70 provides the sole force holding the valve member 60 against the valve block 48 thus providing easy assembly and disassembly of the respective parts. Pivotal movement of the leaf spring 70 with the armature 64 serves to effect vertical movement of the valve member 60 along the planar face 50 of the valve body 48. When the leaf spring 70 is in the dotted line position shown in FIGURE 3, the armature 64 is spaced from the spring arm 43a.

The above described solenoid operated valve assembly is adapted to be used, for example, in a vacuum system for controlling movement of a valve actuator (not shown). In this particular application, the arm member 52, and associated first passageway, are connected through suitable tubing or the like to a source of vacuum, while the arm member 54, and associated second passageway, are connected through suitable tubing or the like to the one end of the valve actuator.

When the solenoid 38 is energized, the armature 64 is attracted downwardly and, while pivoting within the first leg portion 26 of the bracket 22, engages the spring arm 43a slightly bending it downwardly. Downward movement of the armature 64 effects downward movement of the leaf spring 70, which, in turn, causes the valve member 60 to be moved to a first operative position shown in solid lines in FIGURES 3 and 5. In this position of the valve member 60, the channel 62 therein places the ports 58 and 59, and hence the first and second passageways in communication. At this time the vacuum system is permitted to effect movement of the valve actuator from a first position to a second position. When the solenoid 38 is thereafter de-energized, the inherent spring tension in the leaf spring 70, assisted initially by the return force of the spring arm 43a, causes the leaf spring 70 and the valve member 60 to move to the dotted line position shown in FIGURES 3 and 5 where the valve member is normally disposed. With the valve member 60 in this second operative position, communication between the ports 58 and 59, and hence between the first and second passageways, is interrupted. In addition, the side of the valve member 60 abutting the planar face 50 of the valve body 48 serves to close off the port 58 and the first passageway leading from the source of vacuum. Still further, the port 59 and the second passageway are opened to the atmosphere, and a spring associated with the valve actuator returns the latter from its second position to its first position. Accordingly, the valve actuator is vacuum operated in one direction upon energization of the solenoid 38, and spring operated in the other direction upon de-energization of the solenoid 38.

Referring now to FIGURE 6, I shall describe a modified embodiment of my present invention which is constructed and used in the same manner as the solenoid operated valve assembly of FIGURES 1–5, with two exceptions. First, the arm member 54, and associated second passageway, are connected to a source of vacuum, while the arm member 52, and associated first passageway, are connected to the one end of the valve actuator. Secondly, the leaf spring 70 is arranged to normally dispose the valve member 60 in a first operative position shown in solid lines. In this position of the valve member 60, the channel 62 places the ports 58 and 59, and the first and second passageways, in communication. When the solenoid 38 is energized and the leaf spring 70 is pivoted downwardly, the valve member 60 is moved from the solid line position to the dotted line position. In this second operative position, communication between the ports 58 and 59, and between first and second passageways, is interrupted, the port 59 is closed off by the valve member 60, and the port 58 is opened to the atmosphere. When the valve member 60 is in its first operative position upon de-energization of the solenoid 38, the valve actuator is moved by vacuum from its first position to its second position; when the valve member 60 is in its second operative position upon energization of the solenoid 38, the valve actuator is moved by spring force from the second position to its first position.

Referring now to FIGURE 7, I shall describe still another embodiment of my present invention which, except for the valve body and valve member, is the same in construction as the solenoid operated valve assembly of FIGURES 1–5. The valve body 78 of FIGURE 7 has a vertical planar side face 80, and opposed laterally extending arm members 82, 84 and 86. The arm members 82, 84 and 86 are respectively formed with bores 88, 90 and 92 that communicate at their inner ends with ports 94, 96 and 98 which open at the planar face 80. The bore 88 and port 94 define a first passageway, the bore 90 and port 96 define a second passageway, and the bore 92 and the port 98 define a third passageway, in the valve body 78. Vertically slidable along the planar face 80 of the valve body 78 is a valve member 100 having a vertical channel 102 in the side thereof that abuts the planar face 80. In this embodiment of my invention, the arm member 82, and associated first passageway, are connected to a source of vacuum. The arm members 84 and 86, and associated second and third passageways, are connected to the opposite ends of the valve actuator (not shown). The leaf spring 70 normally serves to dispose the valve member 100 in a first operative position shown in solid lines, and the solenoid 38 when energized serves to move the valve member 100, by the leaf spring 70, from the first to a second operative position shown in dotted lines. When the valve member 100 is in the solid line position, the ports 94 and 96, and the first and second passageways, are placed in communication by the channel 102, while the port 98 is open to the atmosphere. The vacuum system is thus effective to move the valve actuator from its first to its second position. When the valve member 100 is moved to the dotted line position, the ports 94 and 98, and the first and third passageways, are placed in communication, while the port 96 is open to the atmosphere. At this time, the vacuum system serves to move the valve actuator from its second to its first position. As will be appreciated, in the use of this embodiment of my invention, the valve actuator is vacuum operated in both directions thus obviating the use of any auxiliary springs.

While I have shown and described what I believe to be preferred embodiments of my present invention, it will be understood by those skilled in the art that various rearrangements and modifications may be made therein without departing from the spirit and scope of my invention.

I claim:

1. In combination, a solenoid, a valve body having at least first and second passageways therein, a valve member movable between a first operative position placing said first and second passageways in communication and a second operative position interrupting communication between said first and second passageways, resilient means adjacent its one end being mounted for movement relative to said solenoid and at its other end being connected to said valve member, said resilient means normally disposing said valve member in one of its operative positions, and said resilient means being movable upon energization of said solenoid whereby to effect movement of said valve member from said one operative position to the other.

2. The combination of claim 1 including a bracket having at least one leg portion, said solenoid being arranged adjacent said bracket, an armature pivotally mounted in said leg portion of said bracket and responsive to energization of said solenoid, and said resilient means adjacent its said one end being connected to said armature.

3. The combination of claim 1 including an armature pivotally mounted relative to said solenoid and responsive to energization of the latter, and wherein said resilient means is a leaf spring connected adjacent its one end to said armature and connected at its other end to said valve member.

4. The combination of claim 1 wherein said valve body has a planar face, said first and second passageways individually open at said planar face, and said valve member is slidable along said planar face between its said first and second operative positions.

5. The combination of claim 1 including a U-shaped bracket having a bight portion and substantially parallel first and second leg portions, said solenoid being arranged intermediate and lengthwise of said first and second leg portions of said bracket, an armature pivotally mounted in said first leg portion of said bracket adjacent the outer end thereof and being responsive to energization of said solenoid, said valve body being secured to said second leg portion of said bracket on the outboard side thereof, and said resilient means adjacent its said one end being connected to said armature.

6. The combination of claim 5 wherein said solenoid has a coil and a core with one end of the latter being connected to said bight portion of said bracket.

7. The combination of claim 5 wherein said second leg portion of said bracket includes stop means for limiting movement of said resilient means.

8. In combination, a generally U-shaped bracket having a bight portion and substantially parallel first and second leg portions, a solenoid intermediate and lengthwise of said first and second leg portions of said bracket and having a coil and a core with one end of the latter connected to said bight portion of said bracket, an armature adjacent the upper end of said core and pivotally mounted in said first leg portion of said bracket adjacent the outer end thereof, a valve body secured to said second leg portion of said bracket on the outboard side thereof, said valve body having a planar face and at least first and second passageways therein individually opening at said planar face, a valve member slidable along said planar face between first and second operative positions, said valve member having a channel therein for placing said first and second passageways in communication when said valve member is in said first operative position, said valve member when in said second operative position interrupting communication between said first and second passageways, a leaf spring connected adjacent its one end to said armature and at its other end to said valve member, said armature and said leaf spring normally disposing said valve member in one of its operative positions, and said armature and said leaf spring being movable upon energization of said solenoid whereby to effect movement of said valve member from said one operative position to the other.

9. The combination of claim 8 wherein one of said passageways is opened to the atmosphere when said valve member is in said second operative position.

10. The combination of claim 8 wherein said valve body has first and second and third passageways therein, and said valve member is movable between a first operative position in which said channel places said first and second passageways in communication and a second operative position in which said channel places said first and third passageways in communication.

References Cited

UNITED STATES PATENTS

| 2,745,630 | 5/1956 | Garner | 251—138 XR |
| 2,852,948 | 9/1958 | Renick | 137—625.64 XR |
| 2,889,109 | 6/1959 | O'Brien. | |
| 2,912,007 | 11/1959 | Johnson | 137—625.64 XR |
| 3,210,041 | 10/1965 | Mitts | 251—131 |

FOREIGN PATENTS 212,912  1/1961  Austria.

H. T. KLINKSIEK, *Primary Examiner.*